United States Patent [19]

Foley et al.

[11] 3,922,472

[45] Nov. 25, 1975

[54] GLASS FIBER REINFORCED ELASTOMERS

[75] Inventors: Kevin M. Foley, Hebron; Frank P. McCombs, Granville, both of Ohio

[73] Assignee: Owens-Corning Fiberglas Corporation, Toledo, Ohio

[22] Filed: Nov. 13, 1974

[21] Appl. No.: 523,387

[52] U.S. Cl.......... 428/429; 260/448.8 R; 427/430; 427/434; 428/288; 428/391; 428/447; 428/448; 428/451
[51] Int. Cl.² ......................................... B32B 17/06
[58] Field of Search...... 260/448.8 R; 161/193, 170, 161/208; 117/126 GB, 126 GS, 126 GN

[56] References Cited
UNITED STATES PATENTS
3,837,898   9/1974   McCombs..................... 117/126 GS

*Primary Examiner*—William J. Van Balen
*Attorney, Agent, or Firm*—Carl G. Staelin; John W. Overman; Keith V. Rockey

[57]     ABSTRACT

Glass fiber reinforced elastomeric products and treated glass fibers for use in the manufacture of same wherein the glass fibers are sized with a composition containing as the essential components a film-forming material, a polyamino silane and a metal salt of an aminoalkyl silane. The glass fibers can be formed into bundles after sizing and impregnated with an impregnating composition containing as its essential component a phenolic-aldehyde resin.

26 Claims, No Drawings

GLASS FIBER REINFORCED ELASTOMERS

This invention relates to a size composition, and more particularly to a size composition with application to glass fibers, to improve the processing and performance characteristics of glass fibers in the manufacture of glass fiber reinforced elastomeric products.

It is conventional practice, in the manufacture of glass fiber reinforced elastomeric products, to coat glass fibers, preferably as they are formed, with a size composition to impart to the individual glass fiber filaments the desired degree of lubricity to prevent destruction of the glass fibers during subsequent processing without destroying the fibrous characteristics of the glass fibers. The sized glass fibers are then formed into strands, cords, yarns or fabrics, generally referred to as bundles, and subjected to impregnation with an impregnating composition formulated to include a phenolic resin either alone or in combination with an elastomeric material. The impregnant in the glass fiber bundle operates to separate the individual glass fiber filaments having the thin size coating thereon each from the other and to cushion the glass fibers and protect the glass fibers when the fibers are combined with an elastomeric material constituting a continuous phase of a glass fiber reinforced elastomeric product.

The term "glass fibers," as used herein, is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air or other attenuating force directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fibrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and particularly copolymers of butadiene with these and terpolymers thereof with styrene and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

Size compositions used in the treatment of glass fibers for reinforcement of elastomeric materials are generally formulated to include an anchoring agent in the form of an organo silicon compound. Preferred organo silicon compounds are organo silanes containing an organic group bonded directly to the silicon atom and substituted by one or more functional groups such as an amino group, a mercapto group, a hydroxy group, an epoxy group, etc., with the remaining valences of the silicon atom being taken up by a readily hydrolyzable group or groups, such as a $C_1$ to $C_5$ alkoxy group or a halogen atom. Most preferred of the organo silanes are amino silanes such as gamma-aminopropyltriethoxy silane. Such silanes are readily hydrolyzable, and thus in aqueous solution may form the corresponding silanols or polysiloxane as hydrolysis products.

Improvements in the use of organo silicon compounds as coupling agents for bonding glass fibers to elastomeric materials are described in U.S. Pat. No. 3,837,898 in which there is disclosed a size composition for use in the treatment of glass fibers wherein the anchoring agent is in the form of a mixture of an aminoalkyl silane having the formula

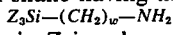

wherein Z is a lower alkoxy group such as methoxy, ethoxy, propoxy, etc., and $w$ is an integer from 2 to 5, and a polyamino silane having the general formula

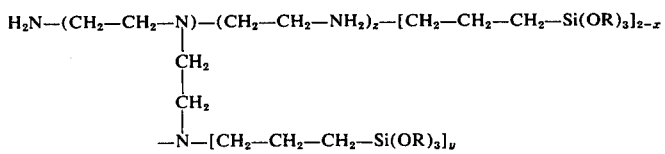

wherein R is lower alkyl, $x$ is an integer from 0 to 2, and $y$ and $z$ are integers, as well as the hydrolysis products of the foregoing compounds. As is described in the foregoing patent, the use of the specific mixture of amino silane provide unexpectedly superior results when glass fibers treated in accordance with the invention described in the foregoing patent are combined with elastomeric materials in the manufacture of glass fiber reinforced elastomeric products. While the size composition described and claimed in the foregoing patent represents a significant advance in the art, there is nevertheless, room for further improvement in the establishment of a secure bonding relationship between glass fibers and elastomeric materials with which the glass fibers are combined in the manufacture of glass fiber reinforced elastomeric products, particularly where the glass fibers are subjected to conditions of relatively high humidities.

It is accordingly an object of the present invention to provide a composition for use in the treatment of glass fibers to improve the processing and performance characteristics of the glass fibers in the manufacture of glass fiber reinforced elastomeric products.

It is another object of the present invention to provide a size composition and glass fibers treated there-with for use in the manufacture of glass fiber reinforced elastomeric materials which are characterized by a significantly improved bonding relationship between the glass fibers and an elastomer constituting the continuous phase of a glass fiber reinforced elastomeric product.

It is a related object of the invention to provide treated glass fibers and bundles of glass fibers which are characterized by improved physical properties, such as improved tensile strength under high humidity conditions.

The concepts of the present invention reside in a composition for the treatment of glass fibers to form a thin film or size coating on the individual glass fiber filaments in which the size composition is formulated to include, as the essential components, a combination of anchoring agents in the form of a mixture of a polyamino silane of the formula

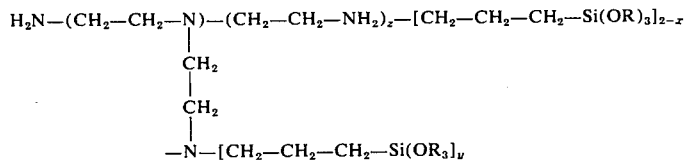

wherein R is lower alkyl, x is an integer from 0 to 2, and y and z are integers, as well as the hydrolysis products of the foregoing compounds, and a metal salt of an aminoalkyl silane wherein the salt has the formula

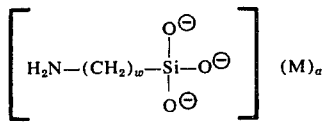

wherein M is the metal, a is 3 divided by valence of the metal, usually 3 or 1.5, and w is an integer from 3 to 6, as well as the hydrolysis products thereof. It has been found when glass fibers treated with this specific combination of anchoring agents and subjected to impregnation with an impregnating composition containing as the essential component a phenolic resin, the resulting bundles of glass fibers have significantly improved tensile strengths, even under high humidity conditions. It has further been found that exposure of glass fibers which have been sized with the foregoing combination of anchoring agents and then impregnated with a phenolic resin exhibit a significantly increased retention in tensile strength after the impregnated bundles of glass fibers have been subjected to high humidity conditions.

The polyamino silanes of the type described above are prepared by reaction of ethylene imine with an aminoalkyl silane; such compounds are commercially available from Dow Corning Corporation under the trademark Z-6050. Salts of the type described above, which can properly be characterized as silanolates, can be prepared in a known manner by reaction of the corresponding amino silane with a hydroxide of the desired metal. The alcohol formed can thus be removed from the silanolate as by distillation. Preferred silanolates are those in which the metal is an alkali metal, such as sodium or potassium or an alkaline earth metal, such as magnesium, calcium, etc.

In the preferred practice of the invention, the metal silanolate and the polyamino silane anchoring agents, are formulated in combination with a film-forming material or binder for the size composition. A wide variety of film-forming binders can be used for this purpose, and include polyester resins, polyamide resins, polyolefin resins, such as polyethylene, polypropylene, modified polyolefins, such as oxidized polypropylene, oxidized polyethylene or combinations thereof, polyepoxide resins, vinyl resins (e.g., polyvinylchloride, polyvinylacetate, polyvinylalcohol, polyvinylpyrrolidone, etc.), polyalkylene glycols, such as polyethylene glycol, polypropylene glycol, waxes, partially dextrinized starch, and others. Many of such film-forming materials are described in U.S. Pat. No's. 2,931,739, 2,958,114, 3,040,413, 3,252,278, 3,424,608. Combinations of two or more of such film-forming materials can also be employed.

It is also possible and some times desirable to formulate the size composition to include conventional additives for glass fiber size compositions, including glass fiber lubricants and/or wetting agents. Glass fiber lubricants are well known to those skilled in the art, and include fatty acid amines containing 8 to 36 carbon atoms, such as laurylamine, stearylamine, palmitylamine, soulblized mineral oils, such as sulfonated mineral oils (e.g., Twitchell 7440 marketed by Emery) and amides prepared by reaction of a fatty acid containing 8 to 36 carbon atoms, such as lauric acid, palmitic acid, oleic acid, linoleic acid with poly (polyoxyethylene) amines. Another lubricant which can be employed is an amide formed by reaction of one of the fatty acids mentioned above with a polyamine having the formula

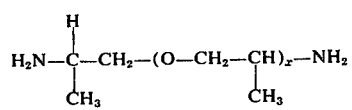

wherein x is an integen suitable amines of the latter type are marketed by Jefferson Chemical and have average molecular weights ranging up to about 2000.

Size compositions formulated in accordance with concepts of this invention are quite stable and can be stored over long periods of time if desired. The stability of such compositions are further improved by formulating the size composition to include a gel agent to adjust the viscosity to a desired level, preferably a viscosity within the range of 50 tp 400 cps. Such gel agents render the size compositions thixotropic.

As the gel agent, use can be made of a wide variety of materials having thixotropic properties. For this purpose, use is preferably made of gel agents formed of cellulose or cellulose derivatives, including carboxymethyl cellulose as well as lower alkyl and lower alkylene glycol ethers of cellulose or methyl cellulose. For example, use can be made of the dimethyl ether of cellulose, the diethyl ether of cellulose, etc., wherein the alkyl in the ether contains 1 to 4 carbon atoms, including methyl, ethyl, propyl, etc. As indicated above, use can also be made of lower alkylene glycol ethers of cellulose and methyl cellulose wherein the glycol forming the ether contains 2 to 4 carbon atoms, including ethylene glycol, propylene glycol and butylene glycol. Representative of suitable cellulose and cellulose derivatives include dimethyl ether of cellulose, ethylene glycol ethers of cellulose, such as hydroxyethyl cellulose marketed by Dow Chemical Company under the trademark XD-1300, propylene glycol ethers of methyl cellulose, which are marketed by Dow Chemical Company under the trade name Methocel HG, methyl cellulose, which is marketed by Dow under the trade name Methocel MC, and butylene glycol ethers of methyl cellulose which are marketed by Dow under the trade name Methocel HB. In addition to the cellulose-type gel agents described above, use can also be made of various other gel agents such as the cross-linked polyacrylamides marketed by Dow Chemical Company under the designation "SA-1300."

The relative proportions of the film forming materials and the combination of anchoring agents employed in the size composition of the invention are not critical and can be varied within relatively wide results. It is generally preferred that the film forming material, when employed, range from about 0.1 to 30 parts by weight of the composition on a dry basis. The amount of the anchoring agents employed can similarly be varied within wide ranges. Usually, a total of the combination of the metal silanolate and the polyamino silane within the range of 0.1 to 15 parts by weight on a dry or water free basis is sufficient. It has been found that best results are usually obtained when the weight ratio of the metal silanolate to the polyamino silane is within the range of ¼ to 4.

When employed, the gel agent should be used in an amount sufficient to adjust the viscosity to within the desired range. An amount of gel agent within the range of 0.5 to 10 parts by weight of the composition on a dry basis is usually sufficient. Comparable amounts of the lubricant may likewise be used, that is amounts within the range of 0.5 to 10 parts by weight on a dry basis.

Having described the basic concepts of the present invention reference is made to the following examples which are provided by way of illustration and not by way of limitation, of the practice of the invention in formulating the size composition and its use in the treatment of glass fibers.

EXAMPLE 1

The potassium salt of gamma-aminopropyltriethoxy silane is prepared by placing 297.2 g of potassium hydroxide (4.54 moles) in a one-liter flask, followed by the addition of 315 ml of water. Thereafter, 355.5 ml (1.51 moles) of gamma-aminopropyltriethoxy silane is added. The resulting mixture is distilled to remove ethanol in the form of the ethanol-water aziotrope, leaving 1.51 moles of the potassium silanolate of the silane $$H_2N-(CH_2)_3-Si(OK)_3.$$

A size composition is formulated as follows

| | Parts by Weight |
|---|---|
| Oxidized polypropylene emulsion (Icopol-30% emulsion) | 1.04 |
| Polyethylene glycol (molecular weight 300) | 0.12 |
| Polyamino silane (Z-6050) | 4.00 |
| Potassium silanolate | 8.34 |

-continued

| | Parts by Weight |
|---|---|
| Gel agent (SA-1300) | 0.30 |
| Lubricant (Twitchell 7440) | 0.38 |
| Water | 85.82 |

The potassium silanolate of gamma-aminopropyltriethoxy silane is then formulated into the following size composition

| | Parts by Weight |
|---|---|
| Oxidized polypropylene emulsion (Icopol-30% emulsion) | 1.04 |
| Polyethylene glycol (molecular weight 300) | 0.12 |
| Polyamino silane (Z-6050) | 4.00 |
| Potassium silanolate | 8.34 |
| Gel agent (SA-1300) | 0.30 |
| Lubricant (Twitchell 7440) | 0.38 |
| Water | 85.82 |

The resulting size composition has a solids content of about 2 percent solids by weight.

The size composition is then applied to glass fibers as they are being formed in accordance with conventional techniques. The sized coating thus serves to form a thin film coating on the glass fiber surfaces.

EXAMPLE 2

This example illustrates the impregnation of a bundle of glass fibers in which the individual glass fiber filaments have been sized in accordance with Example 1.

The glass fibers sized as described in Example 1 are formed into a bundle formed of a strand of the sized glass fibers. The resulting bundles are then impregnated with the following impregnating composition

| | Parts by Weight |
|---|---|
| Phenol-formaldehyde resin | 25.00 |
| Amino silane (Z-6026) | 0.20 |
| Water | 74.80 |

Impregnation with the foregoing impregnant is carried out by immersing the bundles of glass fibers in the impregnant, while subjecting the bundle to a sharp bend as by passing the bundle under a roller, to open the glass fiber bundle and facilitate penetration of the impregnant into the bundle whereby the impregnant serves to separate the fibers forming the bundle each from the other and thereby defining a unitary bundle structure. Methods for impregnation which can be employed are described in U.S. Pat. No. 3,424,608 as well as others.

For purposes of comparison, another size composition was formulated in the same manner as described in Example 1 except that use was made of 8.34 parts by weight of gamma-aminopropyltriethoxy silane instead of potassium silanolate salt thereof. Bundles of glass fibers, sized with the foregoing control size composition, are then subjected to the same impregnation step as described above.

The bundles are then tested to determine their tensile strength both before and after storage for 40 hours at 110°F and 100 percent relative humidity. The results of these tests are set forth in the following table

| Silane Component of Size | Tensile Strength (Dry) | Tensile Strength (Wet) | % Retention |
| --- | --- | --- | --- |
| Z-6050 + gamma-aminopropyltriethoxy silane | 78.3 lbs. | 64.4 lbs. | 82.3 |
| Z-6050 + potassium silanolate | 69.1 lbs. | 72.7 lbs. | 105.2 |

As shown by the foregoing table, storage of the treated glass fibers under conditions of high humidity actually serves to increase the tensile strength of the resulting bundle. The data reveals that 82 percent retention in tensile strength is observed using gamma-aminopropyltriethoxy silane while 105.2 percent is observed using the potassium silanolate of gamma-aminopropyltriethoxy silane.

EXAMPLE 3

This example illustrates the use of an impregnating composition of the type described in U.S. Pat. No. 3,567,671. The impregnating composition is formulated as follows

| Impregnating Composition | Parts by Weight (solids basis) |
| --- | --- |
| Resorcinol-formaldehyde resin (Penacolyte R 2170) | 5.0 |
| Vinyl pyridine-butadiene-styrene terpolymer (Gentac FS) | 30.0 |
| Vinyl chloride-vinylidene chloride copolymer (Dow Latex 874) | 20.0 |
| Microcrystalline paraffin wax | 6.0 |

Water constitutes the balance of the above composition, and is present in an amount sufficient to adjust the solids content of the impregnant to within the range of 20 to 55 percent solids by weight. This impregnating composition is then used to impregnate bundles of glass fibers which have been sized with the size composition described in Example 1. It is found that the size composition securely anchors the impregnant to the glass fiber surfaces.

EXAMPLE 4

Using the procedure described in Example 1, the sodium salt of aminopropylsilane triol is prepared, and formulated into the following size composition

| | Parts by Weight |
| --- | --- |
| Oxidized polypropylene emulsion (Icopol-30% to solids) | 1.50 |
| Polyamino silane (Z-6050) | 0.50 |
| Sodium silanolate | 1.00 |
| Lubricant (Twitchell 7440) | 0.40 |
| Water | 96.60 |

Glass fibers are sized with the foregoing size composition and then subjected to impregnation with the composition of Example 3. Comparable results are obtained.

EXAMPLE 5

Glass fibers which have been sized with the size composition described in Example 1 are subjected to impregnation with an impregnating composition of the type described in U.S. Pat. No. 3,787,224. That impregnant is formulated as follows

| Impregnating Composition | Parts by Weight (solids) |
| --- | --- |
| Resorcinol-formaldehyde resin | 5.0 |
| Vinyl pyridine-butadiene-styrene terpolymer | 30.0 |
| Dicarboxylated butadiene-styrene resin (Pliolite 2106 - Goodyear) | 20.0 |
| Microcrystalline paraffin wax | 6.0 |
| Water to solids content of 35% | |

Comparable adhesion between the glass fiber surfaces and the impregnant are observed.

EXAMPLE 6

Using the procedure described in Example 1, the potassium salt of delta-aminobutylsilane triol
$$H_2N-(CH_2)_4-Si(OK)_3$$
is prepared. This silanolate is then formulated into the following size composition

| | Parts by Weight |
| --- | --- |
| Lubricant (Twitchell 7440) | 0.4 |
| Polyamino silane (Z-6050) | 0.5 |
| Potassium silanolate | 1.2 |
| Water | 97.9 |

Glass fibers sized with the foregoing size composition are then impregnated with the impregnating composition of Example 4. Good adhesion between the glass fibers and the impregnant is observed.

EXAMPLE 7

Using the procedure described in Example 1, MgO is reacted in the presence of water with gamma-aminopropyltriethoxy silane to form the following silanolate

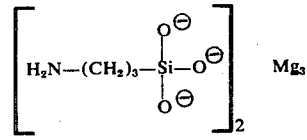

This silanolate is then formulated into the following size composition

| | Parts by Weight |
| --- | --- |
| Polyacetate resin | 2.0 |
| Polyvinylalcohol | 1.0 |
| Wetting agent (Nopcogen 16L) | 0.5 |
| Polyamino silane (Z-6050) | 0.6 |
| Magnesium silanolate | 1.0 |
| Water | 94.9 |

Glass fibers sized with the foregoing composition are subjected to impregnation with the following impregnant

| | Parts by Weight |
|---|---|
| Phenol-formaldehyde resin (25% solids) | 10.0 |
| Butadiene-styrene-vinyl pyridine terpolymer | 50.0 |

Water is added to adjust the solids content to 25 percent by weight solids, and the resulting impregnating composition is used to impregnate bundles of glass fibers treated with the above size composition. Good adhesion between the glass fiber surfaces and the impregnant is observed.

Impregnating compositions employed in accordance with the practice of this invention can be formulated to include either a phenol-aldehyde or a resorcinol-aldehyde resin either alone or in combination with at least one elastomer. In the preferred practice of this invention, the phenol-aldehyde or resorcinol-aldehyde resin is blended with at least one elastomer as described in Examples 4 and 5. In general, the elastomer constitutes between 20 and 60 parts by weight for each 1 to 10 parts by weight of the phenol-aldehyde resin or the resorcinol-aldehyde resin.

In facilitating the combination of glass fibers treated in accordance with the present invention with elastomeric materials, bundles of glass fibers sized with one of the compositions of this invention and impregnated as described above are mixed with elastomeric material or otherwise laid down in the desired arrangement for combination with the elastomeric material, as in the manufacuture of glass fiber reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

We claim:

1. A size composition for use in the treatment of glass fibers comprising an aqueous dispersion of (1) a film-forming material, (2) a polyamino silane having the formula

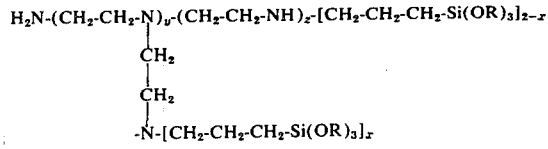

wherein R is alkyl, $x$ is an integer between 0 and 2, and $y$ and $z$ are integers or its hydrolysis products and (3) a salt having the formula

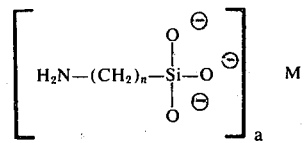

wherein $n$ is an integer from 3 to 6, M is a metal and $a$ is ⅔ or ⅓.

2. A composition as defined in claim 1 wherein M is selected from the group consisting of an alkali metal and an alkaline earth metal.

3. A composition as defined in claim 1 wherein the film-forming material constitutes from 0.1 to 30 percent by weight of the dispersion on a dry basis.

4. A composition as defined in claim 1 wherein the total of the polyamino silane and the salt constitute 0.1 to 15 percent by weight of the dispersion on a dry basis.

5. A composition as defined in claim 1 wherein the weight ratio of the salt to the polyamino silane is within the range of ¼ to 4.

6. A composition as defined in claim 1 wherein the composition includes a glass fiber lubricant.

7. A composition as defined in claim 1 wherein the film-forming material is an oxidized polypropylene.

8. A composition as defined in claim 1 wherein the composition also includes a thickening agent.

9. A composition as defined in claim 1 wherein the metal is an alkali metal.

10. A composition as defined in claim 7 wherein the salt has the formula

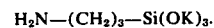

11. Glass fibers having a thin film coating thereon, said coating comprising (1) a film-forming material, (2) a polyamino silane having the formula

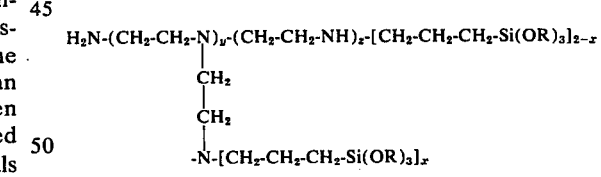

wherein R is alkyl, $x$ is an integer between 0 and 2, and $y$ and $z$ are integers or its hydrolysis products and (3) a salt having the formula

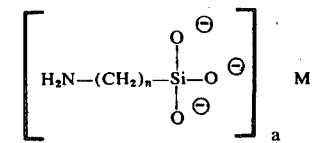

wherein $n$ is an integer from 3 to 6, M is a metal and $a$ is ⅔ or ⅓.

12. Glass fibers as defined in claim 11 wherein M is selected from the group consisting of an alkali metal and an alkaline earth metal.

13. Glass fibers as defined in claim 11 wherein the weight ratio of the salt to the polyamino silane is within the range of ¼ to 4.

14. Glass fibers as defined in claim 11 wherein the coating includes a glass fiber lubricant.

15. Glass fibers as defined in claim 11 wherein the film-forming material is an oxidized polypropylene.

16. Glass fibers as defined in claim 11 wherein the metal is an alkali metal.

17. Glass fibers as defined in claim 15 wherein the salt has the formula
$H_2N-(CH_2)_3-Si(OK)_3$.

18. A glass fiber bundle comprising a plurality of glass fibers, each of the glass fibers having a thin film coating thereon, said coating comprising (1) a film-forming material, (2) a polyamino silane having the formula

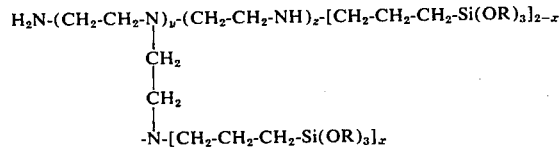

wherein R is alkyl, $x$ is an integer between 0 and 2, and $y$ and $z$ are integers or its hydrolysis products and (3) a salt having the formula

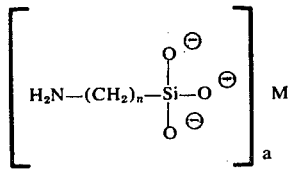

wherein $n$ is an integer from 3 to 6, M is a metal and $a$ is ⅔ or ⅓, and an impregnant in the bundle, said impregnant comprising as the essential component a resin selected from the group consisting of a phenol-aldehyde resin and a resorcinol-aldehyde resin.

19. A glass fiber bundle as defined in claim 18 wherein the resin is a resorcinol-aldehyde resin.

20. A glass fiber bundle as defined in claim 19 wherein the impregnant also includes at least one elastomer.

21. A glass fiber bundle as defined in claim 18 wherein M is selected from the group consisting of an alkali metal and an alkaline earth metal.

22. A glass fiber bundle as defined in claim 18 wherein the film-forming material is an oxidized polypropylene.

23. A glass fiber bundle as defined in claim 18 wherein the metal is an alkali metal.

24. A glass fiber bundle as defined in claim 22 wherein the salt has the formula
$H_2N-(CH_2)_3-Si(OK)_3$.

25. In a glass fiber reinforced elastomeric product wherein an elastomeric material constitutes a continuous phase in which glass fibers are distributed, improvement in the bonding relationship between the glass fibers and the elastomeric materials constituting the continuous phase comprising a bundle of glass fibers as defined in claim 18.

26. In a glass fiber reinforced elastomeric product wherein an elastomeric material constitutes a continuous phase in which glass fibers are distributed, improvement in the bonding relationship between the glass fibers and the elastomeric materials constituting the continuous phase comprising a bundle of glass fibers as defined in claim 24.

* * * * *